UNITED STATES PATENT OFFICE.

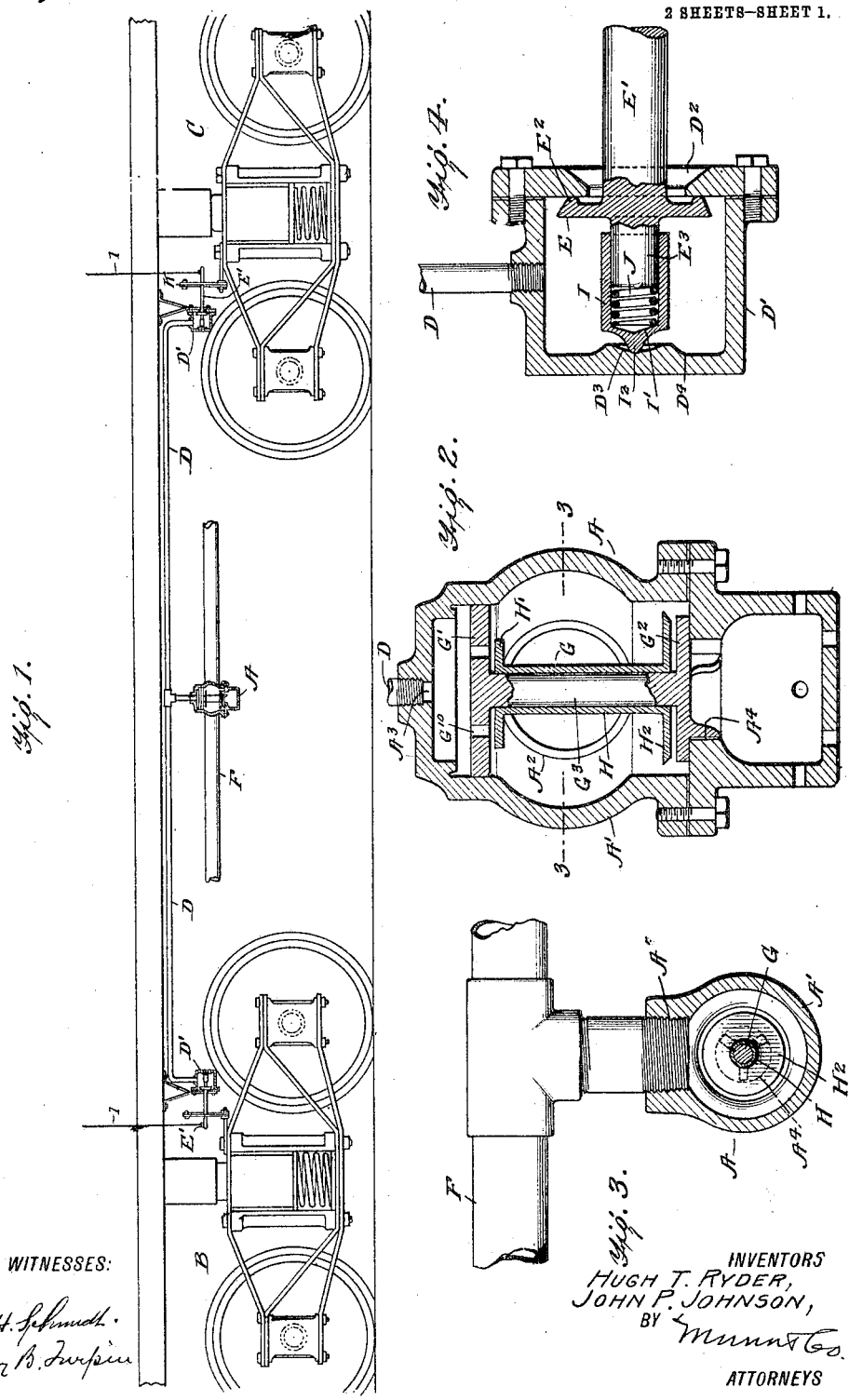

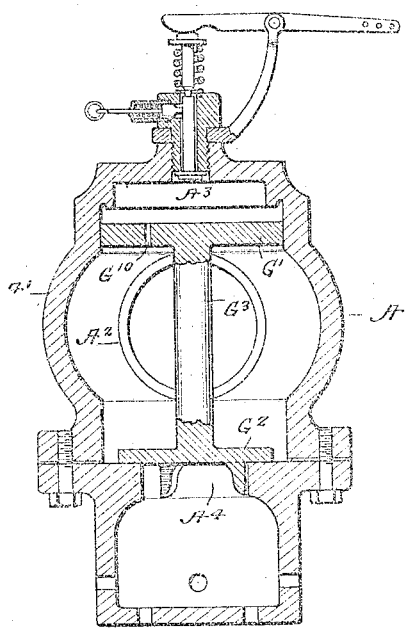
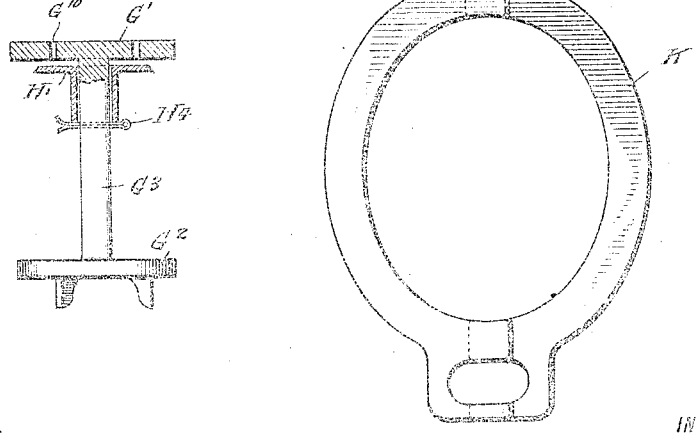

HUGH T. RYDER AND JOHN P. JOHNSON, OF GREENSBORO, NORTH CAROLINA.

AIR-BRAKE MECHANISM.

972,027.

Specification of Letters Patent.

Patented Oct. 4, 1910.

Application filed June 25, 1910. Serial No. 568,913.

*To all whom it may concern:*

Be it known that we, HUGH T. RYDER and JOHN P. JOHNSON, both of Greensboro, in the county of Guilford and State of North Carolina, have invented certain new and useful Improvements in Air-Brake Mechanisms, of which the following is a specification.

This invention is an improvement in automatically operating brake setting devices for use in setting the air brakes in an emergency as when the trucks leave the track or the trucks are otherwise moved abnormally with relation to the car body.

The invention has for an object, among others, to provide in connection with a balanced release valve in connection with the train pipe, a trapped air pipe leading from said release valve to the opposite trucks and automatically operated devices in connection with the opposite trucks for releasing pressure in the trapped air pipe thereby releasing pressure in the release valve and setting the brakes in the usual manner.

The invention also provides in connection with a release valve common to the two trucks of a car, means in connection with the said trucks whereby abnormal movements of either truck relatively to the car body will operate upon a trapped air pipe to release pressure therein and thus permit the escape of pressure from the release valve in a manner more fully described hereinafter.

The invention also seeks to provide a novel construction of release valve and the invention consists in certain novel constructions and combinations of parts as will be hereinafter described and claimed.

In the drawings Figure 1 is an elevation, partly in section, showing our improvements as in use. Fig. 2 is a section view of the release valve. Fig. 3 is a section on about line 3—3 of Fig. 2. Fig. 4 is a detail sectional view of the tripping valve. Fig. 5 is a detail view illustrating the release valve piston without the sleeved spool. Fig. 6 is a detail view showing the said piston with the sleeved spool having but a single head. Fig. 7 is a detail view of the ring like yoke.

In carrying out our invention, we provide what, for convenience of reference, we term a release valve A, which is common to and is preferably located midway between the trucks B and C and a trapped air pipe D leads from the said release valve A to the opposite trucks B and C and communicates at its ends with valve casings D' within which operate the automatically operated valves E which when tripped in the manner presently described, will release pressure in the pipe D, which will cause the piston of the release valve A to lift by the pressure in the train pipe F to which the valve A is connected and this lifting of the piston will permit the air in the train pipe to release from the valve A, thus effecting a setting of the brakes as desired.

An important feature of this invention is the provision in connection with the release valve of a trapped air pipe leading from the release valve to the opposite trucks in connection with automatically operated devices at the opposite trucks for releasing pressure in the trapped air pipe and in the operation of the described construction, it will be noticed that when either of the valves D' is opened, the brakes will be set as a result of the reduction of pressure in the trapped air pipe and the lifting of the piston of the release valve to permit a diminution of pressure in the train pipe F.

The valve A has a casing A' with a port $A^2$ in connection with the train pipe F, a release port $A^3$ connected with the trapped air pipe and an escape port $A^4$ for the escape of pressure in the train pipe to set the brakes. The ports $A^3$ and $A^4$ are arranged on opposite sides of the port $A^2$ and a piston G operates in the casing and has valve heads $G'$ and $G^2$ connected by a rod $G^3$. The valve head $G^2$ controls the escape port $A^4$ and the valve head $G'$ operates in connection with the release port $A^3$ and the piston is normally in the position shown in Fig. 1 with the valve head $G^2$ closing the escape port $A^4$ and the valve head $G'$ in position to permit communication of pressure through its ports $G^{10}$ so the pressure in the train pipe and in the trapped air pipe will be equalized. If now, pressure be reduced in the trapped air pipe, the piston $G^3$ will quickly rise lifting the valve portion $G^2$ and permitting the escape of pressure at $A^4$ to set the brakes.

As shown, the piston G is in the form of a spool and while we may use the piston when constructed as shown in Fig. 5 without the sleeved spool, it may be preferred in some instances to use the sleeved spool H as shown in Figs. 1 and 2 with both the upper head H' and lower head $H^2$ at the opposite ends of the sleeve $H^3$. The said sleeved spool may have a single head as shown in Fig. 6 and be arranged to move to a limited extent along the connecting rod of the piston toward and from the upper head G' thereof and limited in its movement away from said head G' by the cross pin H⁴. However, in the form of spool shown in Fig. 2 with the heads H' and H², it will be noticed that the spool H is of a length greater than the distance between the heads G' and G² so that it may have a certain play longitudinally along the rod G³ and may be moved up to close the ports in the piston head G' or down away from said head G' to expose the said ports and permit the passage of air between the valve and the trapped air pipe. As shown in Figs. 1 and 2, the lower head H² of the sleeve is larger than the head H' and exposes a greater area to the action of the air in the train pipe and the valve A so the said sleeved spool will normally be held in the position shown in Fig. 2 with its lower head H² against the head plate G² of the piston G. If, now, however, pressure in the trapped air pipe be suddenly released, or if pressure be released otherwise above the piston head plate G', the train pipe air in the valve A will quickly move the head H' up against the plate G' closing the ports in said plate G' and forcing the piston upwardly raising the valve plate G² from its seat and permitting the train pipe pressure to escape at A⁴ thus reducing the air pressure in the train pipe and permitting the brakes to set as desired.

In reducing the pressure in the trapped air pipe, we provide in connection with the said pipe D, valve casings D' each located adjacent its respective truck and provided with the automatically operated valve E having a projecting stem E' which will be operated from the truck in a manner presently described. As shown, the valve casing D' has an outlet port D² and the valve E is in the form of a disk operating within the casing D' and spring pressed to close the port D² being provided with an annular bead E² to bear against the valve seat and the valve has a stem E³ projecting beyond the valve E into the casing D' and receiving a tension cup I containing a spring J which bears between the head I' of the cup I and the stem E³ of the valve and normally presses the valve to closed position. At its outer side the end plate I' of the cup I has a pivotal projection I² which sits in normal position in a socket D³ in the head plate of the valve casing D', this being the normal position of the parts with the valve E closed, as shown in Fig. 1. If, now, the stem E' be rocked or tilted in any direction, it will open the valve E and permit pressure in the casing D' to escape, thus releasing the pressure in the trapped air pipe D. At the same time, if the stem E' be moved laterally to such an extent as to force the point I² of the spring actuated cup I out of the socket D³ and into the depressed portion D⁴ surrounding the socket D³, the valve E will be held open until such time as the cup I is readjusted to its normal position, as shown in Fig. 1 of the drawings.

The valve casing D' it will be noticed, is supported by a three point suspension from the car body and in order to operate the valve E, we provide on the car truck a ring like yoke K, preferably in oval form and into which the stem E' projects, the yoke K being of such size as to permit the relative movement of the car body truck under ordinary or normal conditions, without displacing the valve E. If, however, the truck is derailed or is otherwise displaced and moved out of normal position relatively to the car body, the yoke K will operate upon the stem E' of the valve in such manner as to shift the valve to open position causing the release of pressure in the trapped air pipe and the operation of the release valve to secure a setting of the brakes as before described. It will be noticed that the release of pressure in the release valve is secured by an operation in connection with the same air that operates the brakes and that the release of pressure is automatic and results from any abnormal adjustment of the truck relatively to the car body and it will be noticed that the release valve cannot close so long as the truck is out of normal position. It will also be noticed that any slight derangement of the truck without a derailment of the truck, which slight derangement would be sufficient to effect the setting of the brakes, would not prevent the automatic readjustment of the parts to unbraked position when the truck was readjusted to its normal position relatively to the car body. It will also be understood that by the use of the construction shown in Fig. 1 the conductor can check the speed of the train by use of a cord 1 extending in the aisle of the car and located and connected up as indicated in the said figure.

We claim:

1. The improvement in brake setting devices substantially as herein described comprising in combination with the trucks, a balanced release valve common to both trucks, said valve comprising a casing having a train pipe port, a release port, and an escape port and provided with a piston having a valve plate controlling the escape port, a ported valve plate operating in connection with the release port and a rod connecting said valve plates, a spool sliding on the said rod and having a head plate operating in connection with the ported valve plate, a head plate operating in connection with the valve plate opposite said ported plate, the latter spool head plate being of greater area than the former, a trapped air pipe leading from the release port of the release valve to the opposite trucks, valve casings connected with said trapped air pipe and supported from the car body adjacent their respective trucks and having valves provided with projecting stems, and ring-like yokes on the trucks and receiving the stems of their respective valves all substantially as and for the purposes set forth.

2. The combination with the spaced apart trucks, of a release valve common to both said trucks, a trapped air pipe leading from the release valve to the opposite trucks, and automatically operated devices at the opposite trucks for releasing pressure in the trapped air pipe, substantially as set forth.

3. The combination with the train pipe, of an air balanced release valve connected therewith, a trapped air pipe leading from said release valve to the opposite trucks and automatically operated devices in connection with the opposite trucks for releasing pressure in the trapped air pipe, substantially as set forth.

4. The combination with a train pipe and a release valve connected therewith, of a trapped air pipe leading from said release valve and having branches extending into relation with spaced apart trucks, and automatically operated devices remote from the release valve for releasing pressure in the trapped air pipe, substantially as set forth.

5. In an apparatus substantially as described, a release valve comprising a casing having a train pipe port, a release port, and an escape port opposite each other, a piston between the escape and release ports and having a connecting rod, a head plate controlling the escape port and a head plate operating in connection with the release port, and a spool sliding on the connecting rod and having a head movable toward and from the head operating in connection with the release port, said head being ported, substantially as set forth.

6. In an apparatus substantially as described, a release valve, comprising a casing having a train pipe port, a release port, and an escape port opposite each other, a piston between the escape and release ports and having a connecting rod, a head plate controlling the escape port and a head plate operating in connection with a release port, and a spool having a sleeve sliding on the connecting rod of the piston and heads at the opposite ends thereof and operating in connection with the head plates, of the piston, substantially as set forth.

7. A tripping valve for air brake systems comprising a casing having a port for communicating air thereto and provided with an escape port and provided within the casing with a socket for a valve stem and with a depression or recess surrounding said socket, a valve having a plate controlling the discharge port and also provided with an outwardly projecting rod whereby the valve may be operated and with an inwardly projecting stem, a cup fitting at its open end over said stem and having its closed end provided with a pointed projection to enter the socket in the valve casing, the said pointed stem being adapted to project into the recess or depression surrounding said socket under certain displacements of the valve, substantially as set forth.

8. The combination with the spaced apart trucks and the train pipe, of a release valve connected with the train pipe and having means adapted to release pressure in the train pipe under certain circumstances, a trapped air pipe connected with the release valve and extending thence toward the opposite trucks and means operated from the trucks for releasing pressure in the trapped air pipe when the truck is adjusted to an abnormal position relatively to the car body, substantially as set forth.

9. In an apparatus substantially as described, a pressure release valve comprising a casing having a port for communicating air thereto and provided with an escape port, said casing having within it, opposite said escape port, a socket and a recess or depressed portion surrounding the same, a valve for closing the escape port and having an inwardly projecting stem, a cup fitting over the said stem and having at its outer end a point or projection to enter the socket of the casing and a spring within the cup for actuating the valve, all substantially as and for the purposes set forth.

HUGH T. RYDER.
JOHN P. JOHNSON.

Witnesses:
M. L. HOLLADY,
S. P. KERTING.